United States Patent [19]

Armbruster et al.

[11] Patent Number: 5,208,853

[45] Date of Patent: May 4, 1993

[54] METHOD AND APPARATUS FOR USAGE PROTECTION OF DATA FILES USING SPLIT KEY AND UNIQUE VARIABLE

[75] Inventors: Peter J. Armbruster, Chandler; Paul R. Kennedy, Mesa, both of Ariz.

[73] Assignee: Motorola, Inc., Schaumburg, Ill.

[21] Appl. No.: 756,702

[22] Filed: Sep. 9, 1991

[51] Int. Cl.$^5$ ............................................. H04L 9/04
[52] U.S. Cl. ........................................ 380/4; 380/46; 380/47; 380/50
[58] Field of Search ...................... 380/44, 46, 47, 50, 380/4

[56] References Cited

U.S. PATENT DOCUMENTS

| | | | |
|---|---|---|---|
| 4,145,568 | 3/1979 | Ehrat | 380/46 |
| 4,283,599 | 8/1981 | Atalla | 380/46 |
| 4,484,027 | 11/1984 | Lee et al. | 380/46 |
| 4,549,308 | 10/1985 | LoPinto | 380/44 |
| 4,652,698 | 3/1987 | Hale et al. | 380/50 |
| 4,864,616 | 9/1989 | Pond et al. | 380/47 |
| 4,962,827 | 10/1990 | McDonald | 380/46 |
| 5,052,040 | 9/1991 | Preston et al. | 380/50 |
| 5,056,140 | 10/1991 | Kimbell | 380/46 |
| 5,144,659 | 9/1992 | Jones | 380/4 |

*Primary Examiner*—Salvatore Cangialosi
*Attorney, Agent, or Firm*—Jeffrey D. Nehr

[57] ABSTRACT

A split key encryption system to crypto-seal a data file comprising a method for unique variable entry (e.g., terminal serial number), random number generation, key storage device, encryption function for combining the unique variable and the random number to generate an encryption variable in an exclusive-OR function using a variable tap linear feedback shift register, and storage function for receiving the encryption variable and the unencrypted data file. A split key decryption system to unseal the crypto-sealed data file comprises a key storage device, terminal, terminal input, and storage function, with decryption again using an exclusive-OR function using a variable tap linear feedback shift register. A comparator allows use of the unencrypted data file only if the decrypted unique variable matches the terminal serial number.

17 Claims, 3 Drawing Sheets

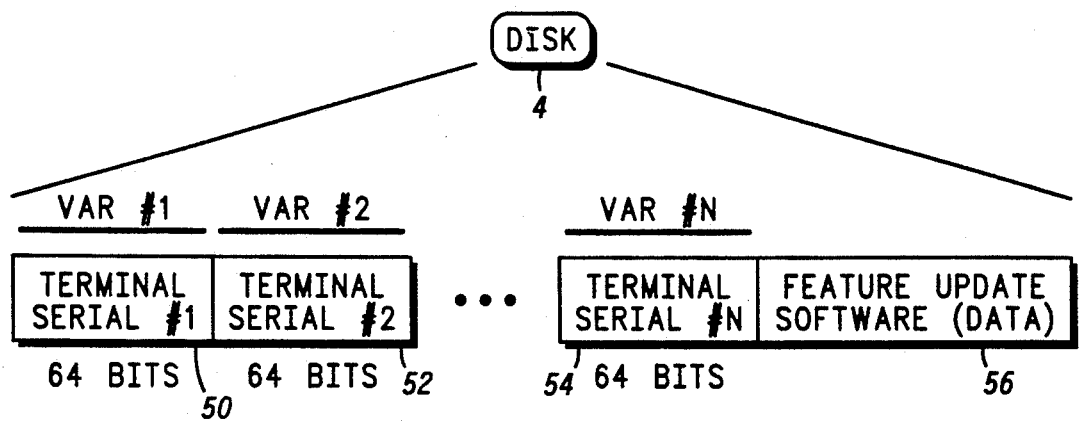
FIG. 3
FIG. 4
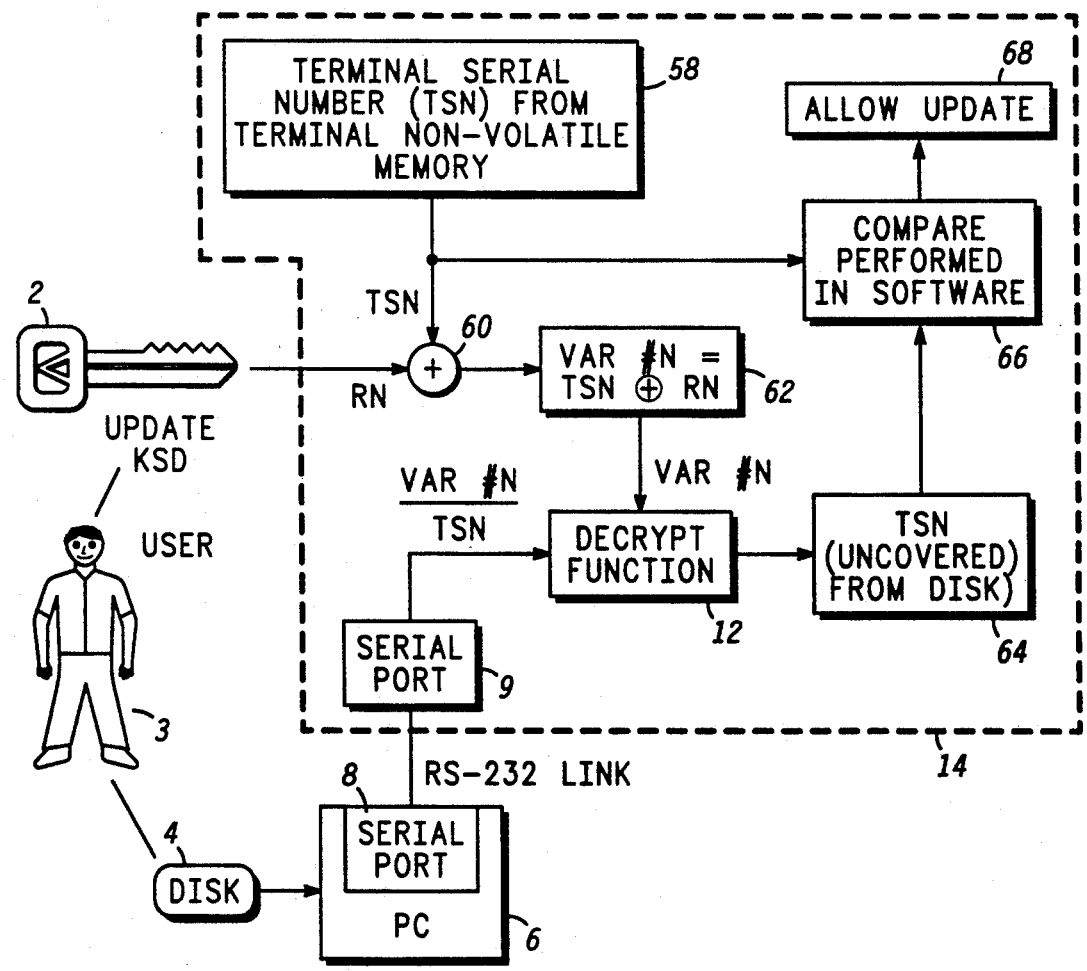

METHOD AND APPARATUS FOR USAGE PROTECTION OF DATA FILES USING SPLIT KEY AND UNIQUE VARIABLE

BACKGROUND OF THE INVENTION

This invention relates in general to the field of protection against unauthorized use of data files, and in particular to protection against unauthorized software updates in terminals.

For terminals in general, and for secure telephones such as the Motorola, Incorporated SECTEL ® Super Economical Terminal (SET) specifically, there is a need to allow the terminal user to update software in the unit (e.g., to fix software "bugs" or to add software enhancements). It is common for the user of a particular group of terminals to wish to expand the capabilities of one or more, but not all, of the terminals within the group (e.g., to add secure facsimile capability to one SET terminal in a group of terminals).

It is typically a problem to provide software enhancements to a user of a group of terminals to upgrade only a subset of the group of terminals without enabling the user to provide the same software enhancement to all terminals within the group. One software upgrade method to prevent unauthorized use, which is time and labor intensive and thus expensive, is to have the software upgrade installed directly by a representative of the software owner. While providing excellent security against unauthorized usage of software updates, etc., this method necessitates physical transportation of a person, as well as the software updates to the user's site, and, because the software updates are typically routine, does not represent a good, cost-effective use of resources for the software upgrade producer.

A second method to prevent unauthorized usage of software updates is for the software producer to separately encrypt a copy of each datafile upgrade for each terminal. The separate encryption of data for each terminal produces a software update version which is usable only by the specific terminal for which it was produced. The individual encryption can be based on a terminal-unique identifier, such as the terminal serial number (TSN). Such encryption requires the production, transportation, and installation of a separately encrypted update for each feature and/or for each "bug" fix. Thus, if one common datafile were to update twenty terminals, twenty separately-encrypted copies of that datafile would have to be produced, transferred to the user, and individually decrypted and installed to update the twenty terminals. It is inefficient and expensive to produce, transfer, decrypt, and install many datafiles when only one copy should be necessary.

Thus, there is a need for a software usage protection system which is simple, efficient, and cost-effective. Such a usage protection system should allow for software updates only for authorized terminals, and not require installation by the software producer. Such a system should, if possible, provide the advantages of cryptographically sealing data files for maximum protection against unauthorized use without actually requiring the encryption of the data files themselves.

SUMMARY OF THE INVENTION

Accordingly, it is an advantage of the present invention to provide a new and improved method for cryptographically sealing data files containing software updates without actually encrypting the data files themselves. It is further an advantage to provide such cryptographic sealing in an inherently simple, economical method. It is still a further advantage to provide protection against unauthorized update and use for multiple terminals based on a split key and unique variable concept.

To achieve these advantages, a method and apparatus for preventing unauthorized use of a data file using a split key encryption system is contemplated, comprising the steps of providing a unique variable, for example a terminal serial number entered through a personal computer keyboard, generating a random number in a personal computer, copying the random number to a key storage device, combining the unique variable and the random number to generate an encryption variable, encrypting the unique variable using the encryption variable, transferring the encrypted unique variable and the data file to a user, and transferring the key storage device to the user.

Decrypting a data file encrypted using a split key encryption system is also contemplated, the method and apparatus comprising the steps of providing an encrypted unique variable, the data file, and a key storage device with a random number, decrypting the encrypted unique variable to produce a unique variable using the random number from the key storage device, comparing the unique variable to a terminal number, and enabling the use of the data file if the unique variable matches the terminal number.

The above and other features and advantages of the present invention will be better understood from the following detailed description taken in conjunction with the accompanying drawings.

BRIEF DESCRIPTION OF THE DRAWINGS

In FIG. 3, there is shown a schematic drawing of encrypted unique terminal identifiers (terminal serial numbers) and unencrypted data on a disk.

In FIG. 4, there is shown a schematic drawing of a split key decryption system and method for allowing a software update from unique terminal identifiers (terminal serial numbers) encrypted in accordance with the process shown in FIG. 1.

DETAILED DESCRIPTION OF THE PREFERRED EMBODIMENT

Figure 1:
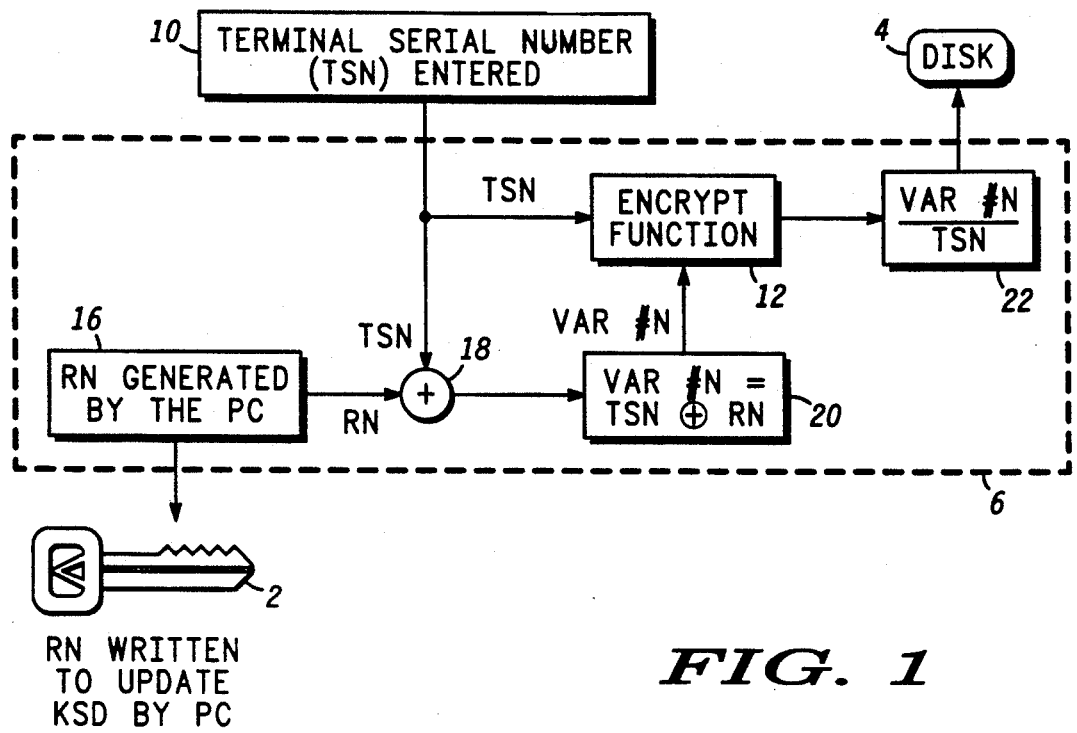
In FIG. 1, there is shown a schematic drawing of a split key encryption system and method for producing protected software updates in accordance with a preferred embodiment of the invention.

FIG. 1 illustrates a split key encryption system and method for producing protected software updates in accordance with a preferred embodiment of the invention. FIG. 1 illustrates schematically a key storage device (KSD) 2, a computer disk 4, a computer, such as a personal computer (PC) 6, and a computer keyboard 10. These components are involved in the encryption of user unique variables (such as the serial numbers for terminals to be updated) to accompany unencrypted data files on computer disk 4. The description below will assume the use of terminal serial numbers (TSNs) as the unique user numbers to be encrypted. Note, however, that any terminal number or identifier can be used.

PC 6 comprises random number generator 16, exclusive-OR function 18, variable number (VAR#N) producer 20, encrypter 12 (which comprises a variable tap Linear Feedback Shift Register (LFSR)), and the encrypted (or covered) TSN output 22. TSN output 22 is covered by VAR#N before it is written to computer disk 4.

The split key encryption method is shown by the arrows relating the functional steps and hardware shown in the boxes within FIG. 1. The producer of the software feature upgrade will have a PC 6 which can generate an update computer disk 4 and an updated KSD 2 to be transferred to the user. The user first sends a list of TSNs on which the feature upgrade is intended to be installed.

After the software producer enters the TSNs on the computer keyboard 10, the PC 6, as shown in box 16 will generate a random number, RN, and write it to the update KSD 2. RN in this embodiment is a 64-bit number. The PC 6 also combines, by means of an exclusive-OR function 18, the TSN and RN to generate an encryption variable VAR#N 20.

VAR#N 20 is input into the encrypt function LFSR 12 along with the TSNs via keyboard 10. LFSR 12 generates a covered version of each TSN, i.e., a version of each TSN encrypted with VAR#N, and designated as VAR#N/TSN.

The LFSR 12, in performing the encryption of the TSN, is first initialized to a known value. The LFSR 12 function can be performed by PC 6 software. VAR#N 20 is used to set the taps on the variable LFSR 12 to actually perform the encryption (a TSN entered at the keyboard 10 is then passed through the LFSR 12 to produce the covered version of the TSN). In repeating the process for a series of TSNs, each TSN can be covered with a unique VAR#N.

Since the VAR#N consists of two split variables, RN and TSN, this encryption is termed "split key". When all the TSNs have been covered, they can be written as a group to the disk 4 by the PC 6, along with an unencrypted version of the feature update software or "bug" fix, etc. The data files of the update are not encrypted, but the existence of unique variables that must be decrypted in order to use the unencrypted data files effectively crypto-seal the files and protect against unauthorized usage. In this embodiment, up to 255 TSNs can be written onto the update disk.

Note that although split key encryption is often very desirable for maximizing protection against unauthorized usage, there is no requirement that RN be present on the update KSD 2. If desired, RN could be placed on the computer disk 4 in addition to the covered TSNs so that only a single "key", i.e. the computer disk 4, need be used to authorize the update. Moreover, it would also be possible to send the key information by electronic transfer so that no physical exchange of KSD 2 or computer disk 4 would be required to authorize use of the crypto-sealed data files. The split key can also be achieved with a non-physical device such as a password.

Figure 2:
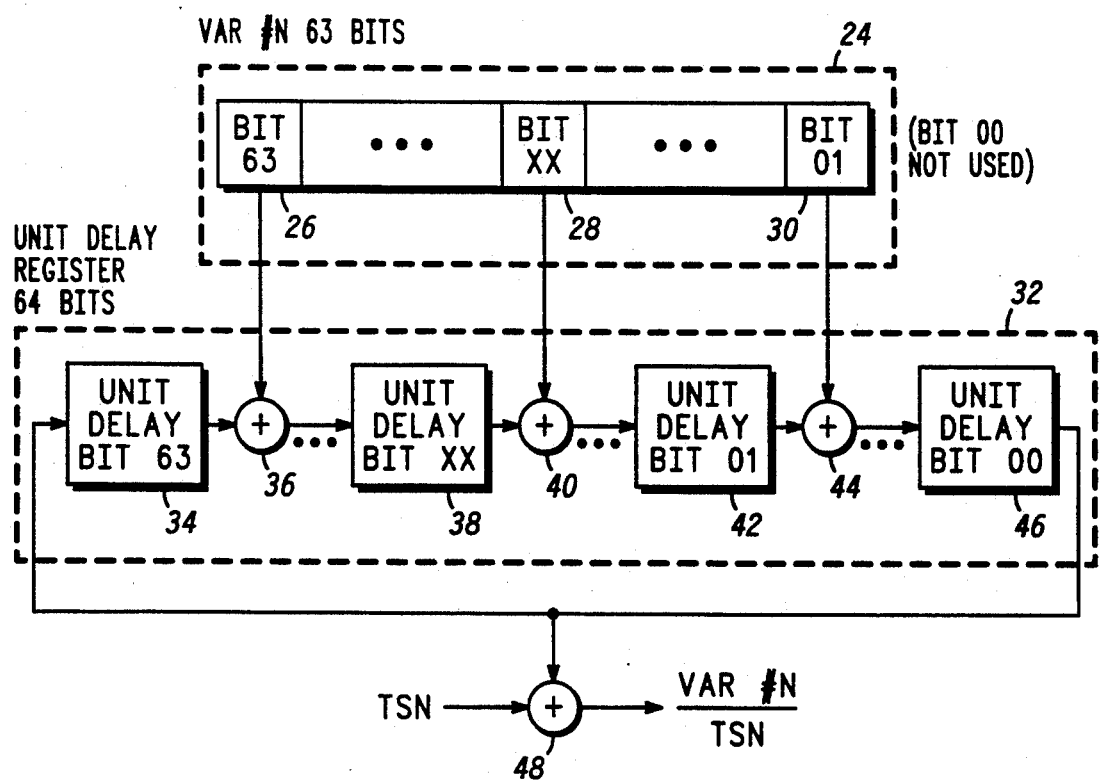
In FIG. 2, there is shown a schematic drawing of a variable tap linear feedback shift register (LFSR) method and apparatus for data encryption.

FIG. 2 shows a schematic drawing of a variable tap LFSR method and apparatus for the actual encryption of a TSN. VAR#N 24 is used to set the taps within the LFSR. Sixty-three bits of VAR#N are used, with bit 00 of VAR#N unused. VAR#N is comprised in part of bit 63, shown in box 26, bit XX, shown in box 28, and bit 01, shown in box 30. Omitted bits in the sequence of bits within VAR#N are shown by ellipses.

The Unit Delay Register 32 of the LFSR in FIG. 2 is comprised of 64 bits, including the unit delay for bit 63, shown in box 34, the unit delay for bit XX, shown in box 38, the unit delay for bit 01, shown in box 42, and the unit delay for bit 00, shown in box 46. Omitted bits in the sequence of bits within the Unit Delay Register are shown by ellipses.

In the example of the SECTEL ® SET terminal, the TSN is a 56-bit number written into the terminal non-volatile memory at the factory. Leading zeros are used to expand the length of the TSN to 64 bits. The initialization vector, IV, is a 64-bit number used to initialize the Unit Delay Register of the LFSR to a known starting state. The cover process uses the encryption variable, VAR#N, to determine the feedback tap locations. A logic zero in the VAR#N will cause that bit position to become an active tap. The Unit Delay Register must be initialized with the IV prior to encryption.

In FIG. 2, the output of the exclusive-ORing of each bit of VAR#N with its corresponding bit from the Unit Delay Register is exclusive-ORed with the TSN to produce a covered TSN. Thus, the inputs to exclusive-OR 36 are bit 63 in box 26 of VAR#N 24, and unit delay bit 63 in box 34 of Unit Delay Register 32. Similarly, inputs to exclusive-OR 40 are bit XX in box 28 of VAR#N 24, and unit delay bit XX in box 38 of Unit Delay Register 32. Also, the inputs to exclusive-OR 44 are bit 01 in box 30 of VAR#N 24, and unit delay bit 01 in box 42 of Unit Delay Register 32.

In FIG. 3, there is shown a schematic drawing of encrypted unique terminal identifiers (terminal serial numbers) and unencrypted data on a disk. Disk 4 contains a sequence of covered TSNs, with each TSN#X covered by a corresponding VAR#X, i.e., TSN#1 is covered by VAR#1 as shown in box 50, TSN#2 is encrypted by VAR#2 as shown in box 52, TSN#N is covered by VAR#N as shown in box 54, etc. FIG. 3 shows N of such covered TSNs, each of 64-bit length, preceding the feature update software, or DATA as shown in box 56. The unencrypted data 56 can be used to update as many of the N terminals as is desired by the user and authorized by the supplier.

In FIG. 4, user 3 is updating terminal 14 using the update KSD 2 and the computer disk 4 in PC 6. The serial port 8 of PC 6 is coupled to the terminal 14 via the serial port 9 of the terminal 14. With the terminal 14 in an update mode, i.e. able to accept data from the PC 6, the user 3 executes the download software program on the PC 6. The download software program can be stored on the disk 4.

The terminal 14 reads RN from the KSD 2. The terminal 14 then uses exclusive-OR function 60 on RN and the TSN for the terminal 14 from the non-volatile memory 58. The result is the encryption variable VAR#N 62. VAR#N 62 is then used to set the taps of the variable LFSR in the decryption function 12.

In addition to the VAR#N 62 input into the decryption function 12, the version of TSN encrypted with VAR#N is input into the decryption function 12 from serial port 9. The LFSR 12, after being initialized to a known starting state, produces an uncovered TSN 64 from the two inputs.

The terminal 14 then compares its internal TSN from non-volatile memory 58 to the uncovered TSN 64. As shown in box 66, the comparison can be performed in software, with the allowance of an update 68 if and only if the two TSNs match. If no match is obtained, the terminal 14 can uncover the next covered TSN from the disk 4. If all TSNs are uncovered and a match has not been found to the internal TSN from non-volatile memory 58, the software upgrade is not performed.

Figure 5:
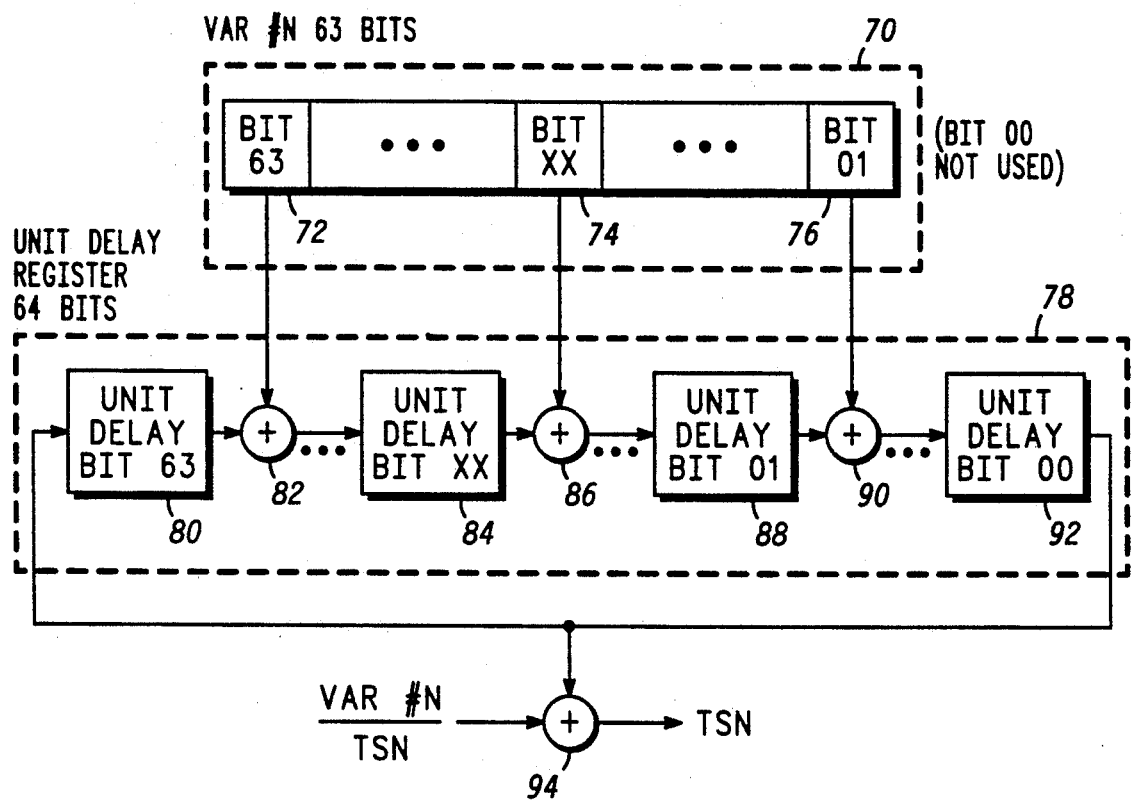
In FIG. 5, there is shown a schematic drawing of the variable tap LFSR method and apparatus for data decryption.

FIG. 5 illustrates the variable tap LFSR method and apparatus for data decryption. VAR#N 70 is used to set the taps within the LFSR. Sixty-three bits of VAR#N are used, with bit 00 of VAR#N unused. VAR#N is comprised in part of bit 63, shown in box 72, bit XX, shown in box 74, and bit 01, shown in box 76. Omitted bits in the sequence of bits within VAR#N are shown by ellipses.

The Unit Delay Register 78 of the LFSR is comprised of 64 bits, including the unit delay for bit 63, shown in box 80, the unit delay for bit XX, shown in box 84, the unit delay for bit 01, shown in box 88, and the unit delay for bit 00, shown in box 92. Omitted bits in the sequence of bits within the Unit Delay Register 78 are shown by ellipses.

In the inverse manner to that used in encryption in FIG. 2, in the decryption shown in FIG. 5, the output of the exclusive-ORing of each bit of VAR#N 70 with its corresponding bit from the Unit Delay Register 78 is exclusive-ORed 94 with the covered TSN to produce an uncovered TSN. Thus, the inputs to exclusive-OR 82 are bit 63 in box 72 of VAR#N 70, and unit delay bit 63 in box 80 of Unit Delay Register 78. Similarly, inputs to exclusive-OR 86 are bit XX in box 74 of VAR#N 70, and unit delay bit XX in box 84 of Unit Delay Register 78. Also, the inputs to exclusive-OR 90 are bit 01 in box 76 of VAR#N 70, and unit delay bit 01 in box 88 of Unit Delay Register 78.

Thus, usage protection of data files using split key and unique variable methods and apparatus has been described which accomplishes certain advantages relative to prior art methods and mechanisms. The improvements are significant. First, such usage protection protects update files based on a unique variable, such as a unique serial number. Second, only the serial number(s) preceding the data files need be protected using this scheme. The actual data need not be protected. The covering of the unique number seals the data file using the split key principle and a large number of terminals can be updated with a single data file. Third, the LFSR with its variable taps, once initialized to an initial value, can function as an encryptor by passing data through the LFSR to cover it, and can function also as a decryptor if it is reinitialized and if the covered data is passed through the variable LFSR again.

Thus, there has also been provided, in accordance with an embodiment of the invention, a method and apparatus for usage protection of data files using a split key and unique variable which overcomes specific problems and accomplishes certain advantages and which fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A method for preventing unauthorized use of an unencrypted data file using a split key encryption system, the method comprising the steps of:

providing a unique variable;
generating a random number;
copying the random number to a key storage device;
combining the unique variable and the random number to generate an encryption variable;
encrypting the unique variable using the encryption variable, resulting in an encrypted unique variable;
transferring the encrypted unique variable and the unencrypted data file to a user; and
transferring the key storage device to the user.

2. A method for preventing unauthorized use of a data file using a split key encryption system as claimed in claim 1, wherein the step of providing a unique variable comprises the step of providing a terminal serial number in non-volatile memory of a terminal.

3. A method for preventing unauthorized use of a data file using a split key encryption system as claimed in claim 1, wherein the step of generating a random number comprises the step of producing a random number by a personal computer.

4. A method for preventing unauthorized use of a data file using a split key encryption system as claimed in claim 1, wherein the step of combining the unique variable and the random number to generate an encryption variable comprises the step of exclusive-ORing the unique variable and the random number.

5. A method for preventing unauthorized use of a data file using a split key encryption system as claimed in claim 1, wherein the step of encrypting the unique variable using the encryption variable comprises the steps of:

initializing a variable tap linear feedback shift register to a known starting state with a known initialization vector;
selecting taps on the variable tap linear feedback shift register using the encryption variable; and
passing the unique variable through the linear feedback shift register to produce the encrypted unique variable.

6. A method for preventing unauthorized use of a data file using a split key encryption system as claimed in claim 1, wherein the step of transferring the encrypted unique variable and the data file to a user comprises electronically transferring the encrypted unique variable and the data file to a user.

7. A method for enabling use of an unencrypted data file protected against unauthorized usage with a split key encryption system, the method comprising the steps of:

providing an encrypted unique variable, the unencrypted data file, and a key storage device with a random number;
decrypting the encrypted unique variable to produce a unique variable using the random number from the key storage device;
comparing the unique variable to a terminal number; and
enabling the use of the unencrypted data file if the unique variable matches the terminal number.

8. A method for decrypting a data file encrypted using a split key encryption system as claimed in claim 7, wherein the step of decrypting the encrypted unique variable comprises the steps of:

reading the random number from the key storage device;
exclusive-ORing the random number with the terminal number to generate an encryption variable;

initializing a variable tap linear feedback shift register to a known starting state with a known initialization vector;

selecting taps on the variable tap linear feedback shift register using the encryption variable; and passing the encrypted unique variable through the linear feedback shift register to produce the unique variable.

9. A split key encryption system for crypto-sealing an unencrypted data file comprising:

unique variable entry means for generating a unique variable;

random number means coupled to the unique variable entry means, the random number means to generate a random number and to write the random number;

key storage device means coupled to the random number means, the key storage device means for receiving the random number;

encryption means coupled to the unique variable entry means and to the random number means, the encryption means for combining the unique variable and the random number to generate an encryption variable; and storage means coupled to the encryption means, the storage means for storing the encryption variable and the unencrypted data file.

10. A split key encryption system to crypto-seal a data file as claimed in claim 9, wherein the random number means comprises a personal computer for producing the random number.

11. A split key encryption system to crypto-seal a data file as claimed in claim 10, wherein the unique variable entry means comprises a personal computer keyboard coupled to the personal computer, the personal computer keyboard for entering a terminal serial number.

12. A split key encryption system to crypto-seal a data file as claimed in claim 10, wherein the encryption means comprises:

a variable tap linear feedback shift register means coupled to the personal computer and initialized to a known starting state with a known initialization vector;

tap means coupled to the variable tap linear feedback shift register means;

exclusive-OR means coupled to the tap means to combine the unique variable and the random number to generate the encryption variable.

13. A split key encryption system to crypto-seal a data file as claimed in claim 10, wherein the storage means comprises a computer diskette means computer coupled to the personal computer, the diskette means for receiving the encrypted unique variable and the data file.

14. A split key decryption system to unseal an unencrypted data file which has been crypto-sealed, the split key decryption system comprising:

key storage device means for storing a random number;

terminal means coupled to the key storage device means;

terminal input means coupled to the terminal means;

decryption means for decrypting the encrypted unique variable to produce a unique variable using the random number;

storage means coupled to the terminal input means, the storage means for storing an encrypted unique variable and the unencrypted data file, and comparator means coupled to the decryption means, the comparator means for comparing the unique variable with the terminal number.

15. A split key decryption system to unseal a data file which has been crypto-sealed as claimed in claim 14, wherein the terminal input means comprises:

computer means coupled to the storage means, the computer means for reading the encrypted unique variable and the data file from the storage means; and communication link means coupled between the computer means and the terminal means, the communication link means for transferring the encrypted unique variable and the data file from the computer means to the terminal means.

16. A split key decryption system to unseal a data file which has been crypto-sealed as claimed in claim 15, wherein the terminal means comprises:

decryption means coupled to the key storage device means and to the communication link means, the and update means coupled to the comparator means, the update means for allowing the terminal means to use the data file if the unique variable is identical to the terminal number.

17. A split key decryption system to unseal a data file which has been crypto-sealed as claimed in claim 16, wherein the decryption means comprises:

reading means coupled to the key storage device means for reading the random number from the key storage device means;

non-volatile memory means for storing the terminal number;

first exclusive-OR means coupled to the reading means and to the non-volatile memory means, the first exclusive-OR means for exclusive-ORing the random number with the terminal number to generate an encryption variable;

variable tap linear feedback shift register means coupled to the first exclusive-OR means and to the terminal input means, the variable tap linear feedback shift register means being initialized to a known initialization vector;

tap means coupled to the variable tap linear feedback shift register means;

second exclusive-OR means coupled to the tap means for exclusive-ORing the encryption variable and the random number to generate the unique variable.

* * * * *